Dec. 15, 1964   A. N. SVENSSON   3,161,443
TRACTOR TRACKS
Filed Dec. 19, 1961   5 Sheets-Sheet 2

Inventor
ASSAR NATANAEL SVENSSON
by Sommers + Young
Attorneys

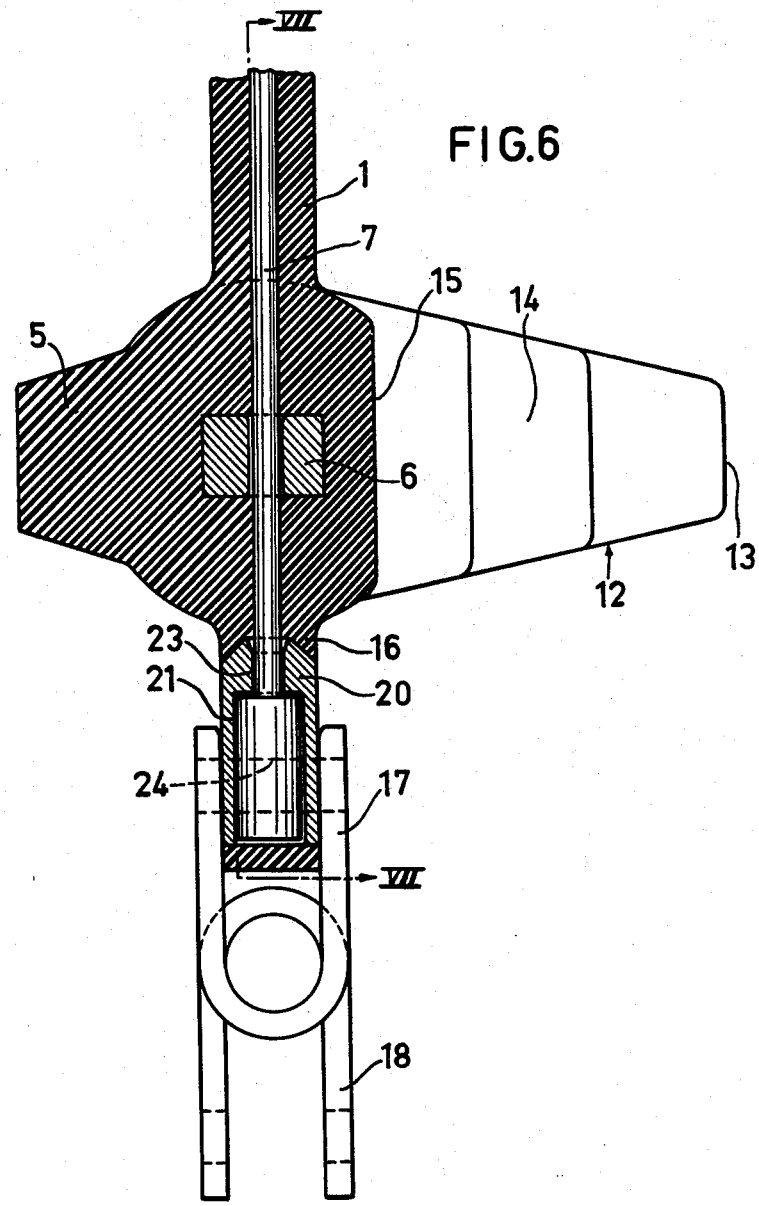

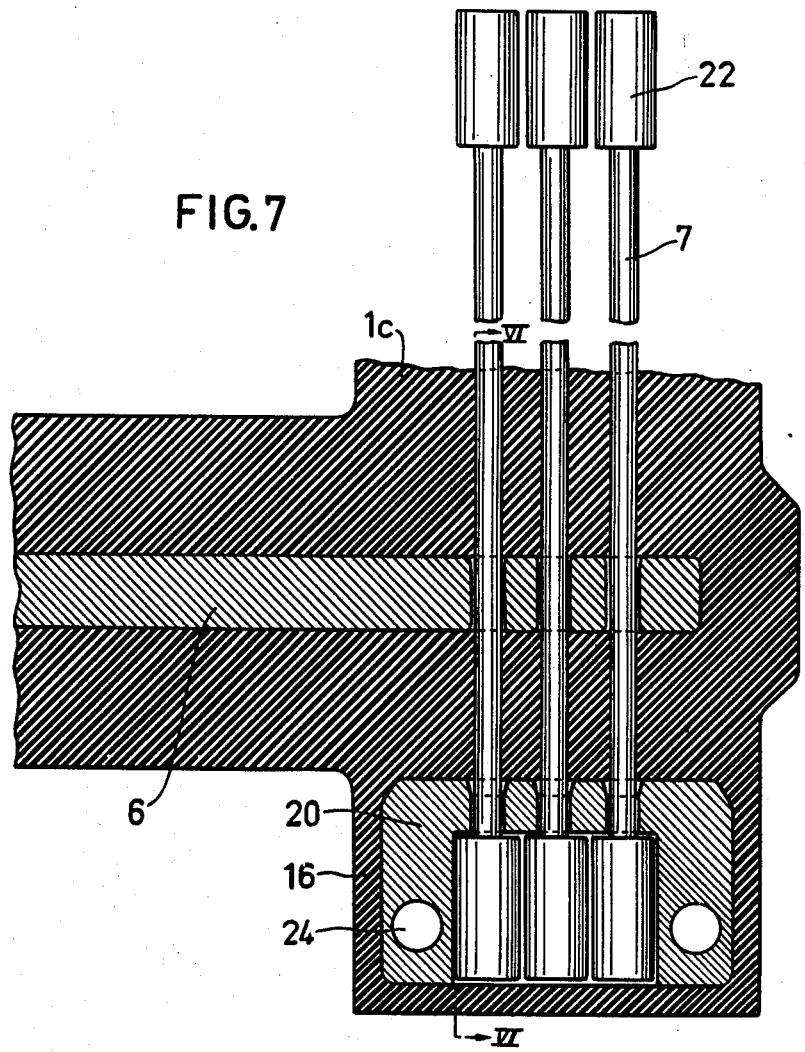

United States Patent Office 3,161,443
Patented Dec. 15, 1964

3,161,443
TRACTOR TRACKS
Assar Natanael Svensson, Ersmark, Sweden, assignor to Skelleftea Gummifabriks A.-B., a Swedish joint-stock company
Filed Dec. 19, 1961, Ser. No. 160,488
Claims priority, application Sweden Dec. 21, 1960
11 Claims. (Cl. 305—13)

This invention relates to tractor tracks adapted to run on the outside surface of the tractor wheels, which wheels are usually of different size on one side of the tractor. It is the object of the invention to produce a track distinguishing over previously known tracks by its more noise free running while at the same time having a less destructive effect on roads and ways. Furthermore, the wearing of the tractor tires by the track according to the invention is considerably less than that produced by conventional tracks.

The track according to the invention is provided with transverse rods of steel or the like connected by traction absorbing means, for example steel wires arranged in the longitudinal direction of the respective portions of the track and together with the rods are substantially enclosed in an elastomer material, preferably rubber. The invention is substantially characterized in that transversely extending external ribs, shoulders or the like are provided for effecting engagement of the track with the soil, and also is provided with inwardly directed projections of the inner face of the track for controlling engagement with the tractor wheels, the said ribs, shoulders and projections all being formed in one piece with said elastomer material.

The invention will be described in detail in the following, reference being had to the accompanying drawings showing by way of example some different embodiments of the invention.

FIG. 6 is a longitudinal section of a portion of a modified embodiment of a track near the joint taken along the line VI—VI in FIG. 7.

FIG. 7 is a section of a portion of the modified embodiment of a track taken along the line VII—VII in FIG. 6.

Figure 1:
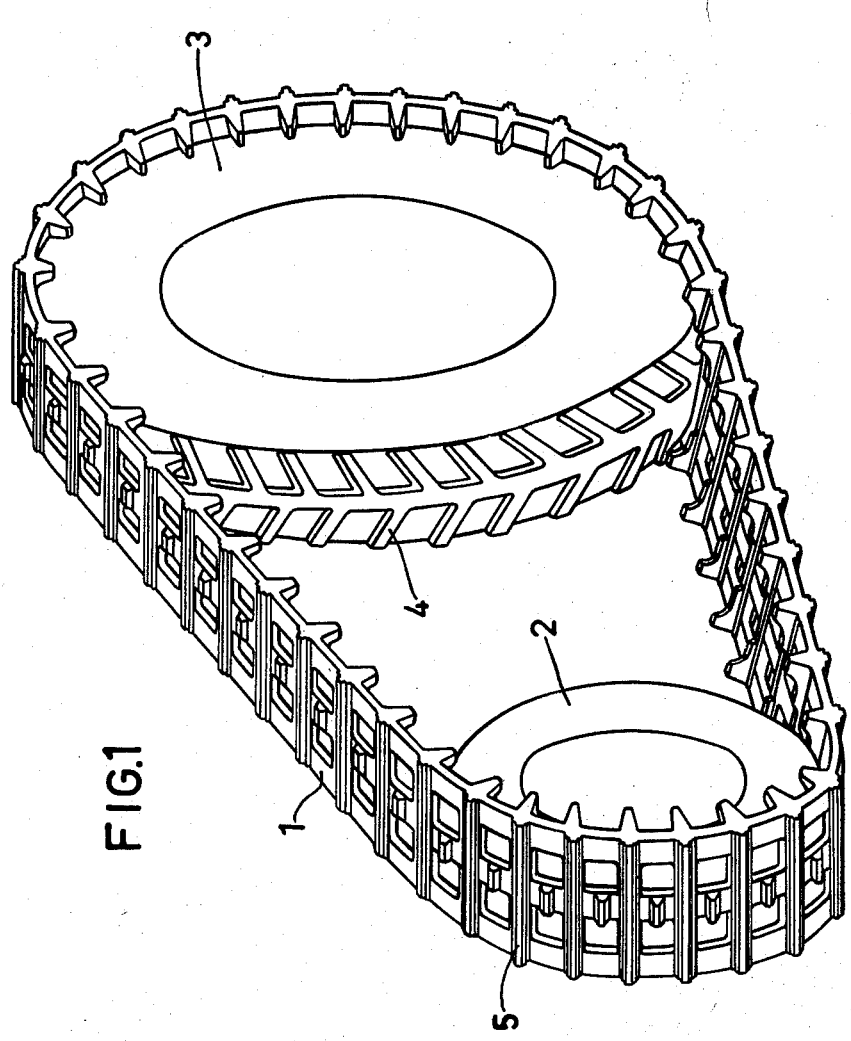
FIG. 1 is a perspective of a track mounted on two tractor wheels.

As appears from FIG. 1, the track 1 is intended to be stretched about the two tractor wheels 2 and 3 the larger of which, 3, is provided with ribs 4 for engagement with the track 1, in the manner described in the following. For increasing soil engagement, the track is provided with ribs 5, which, like the track, in general, consists substantially of elastomer material, preferably rubber.

As illustrated most clearly in FIGS. 2–5, the ribs 5 are reinforced by rods 6 extending transversely of the track and, preferably, divided into two halves 6a and 6b which are coupled together by traction absorbing means, in this embodiment steel wires 7 running in the longitudinal direction of the track and arranged to be clamped between the rod halves 6a and 6b which are connected by riveting or in another suitable manner. The coupling of the rod halves 6a and 6b with one another and with the steel wires 7 may, for example, be effected only by firm connection with the elastomer material, for example by vulcanization. In the joint of the track the wires 7 run about sleeves 8 enclosed in the track and adapted for receiving jointing bolts 9 or the like.

The wires 7 coupling the ribs with one another are entirely enclosed in three bars 1a, 1b and 1c spaced apart laterally forming holes 10 between said bars and the ribs whereby the track-soil engagement on loose ground is improved still more. Shoulders 11 disposed between the ribs 5 on the middle track bar 1b contribute further to the improvement of said track-soil engagement and, besides, improve the lateral control of the track. The shoulders 11 prevent coherent soil lumps or the like from being formed between two adjacent ribs, and render possible smooth running of the tractor.

For holding the track firmly on both wheels of the tractor, which usually are of very different size, the longitudinal track edges are provided with inwardly directed projections 12 immediately in front of the rods 6, which projections extend sideways in steps 13, 14 and 15 of different height for cooperating with the wheels of different size. The steps 13 are adapted to be mounted over the tire sides of the tires of the larger wheels, and thus, to effect lateral control of the track, while the steps 14 have the same function in cooperation with the smaller wheels. The steps 14 are further intended to engage between the ribs 4 of the larger tires. The base step 15 is intended to abut the outer periphery of the smaller as well as larger tires.

Figure 5:
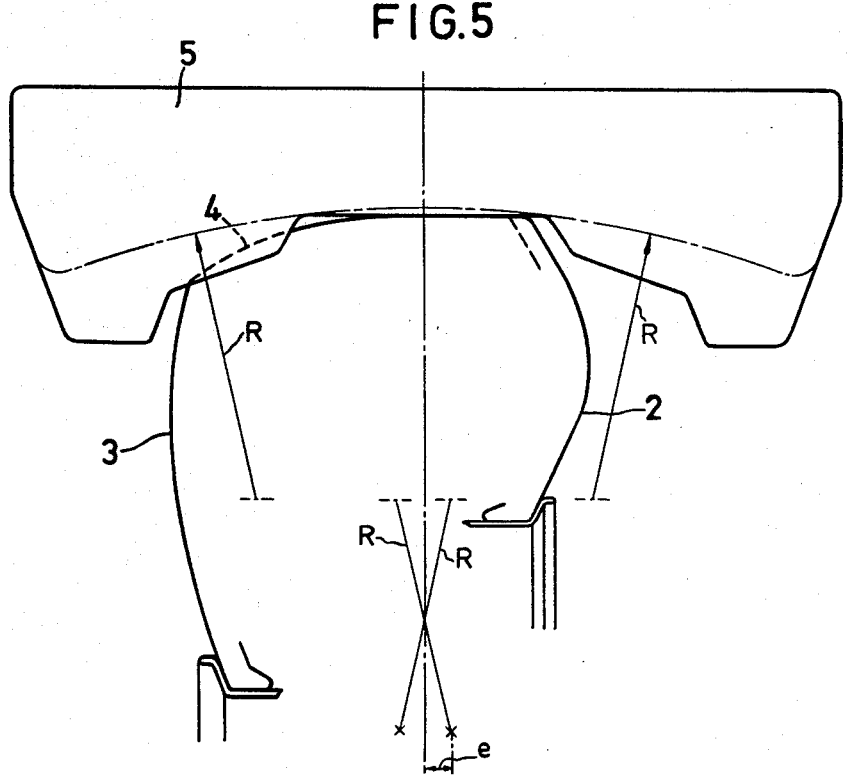
FIG. 5 is a diagrammatic view illustrating the cooperation of the track with the tires on the tractor wheels, the left-hand portion of the figure showing the engagement between the track and the tractor wheel of greater size, and the right-hand portion of the figure showing the engagement between the track and the tractor wheel of smaller size.

As indicated by dash-dotted lines in FIG. 5, the steps 13–15 may be omitted and substituted by projections with concave surfaces towards the wheels, the centre of curvature of the projection on the right-hand side of the track preferably being situated to the left of the central plane of the track, and vice versa. The distance $e$ between the central plane of the track and the centre of curvature of the respective concave surface may be chosen to be 5–15% of the curvature radius R. The concave surface may possibly be given a somewhat sharper curvature, that is a somewhat smaller curvature radius R than shown.

Figure 2:
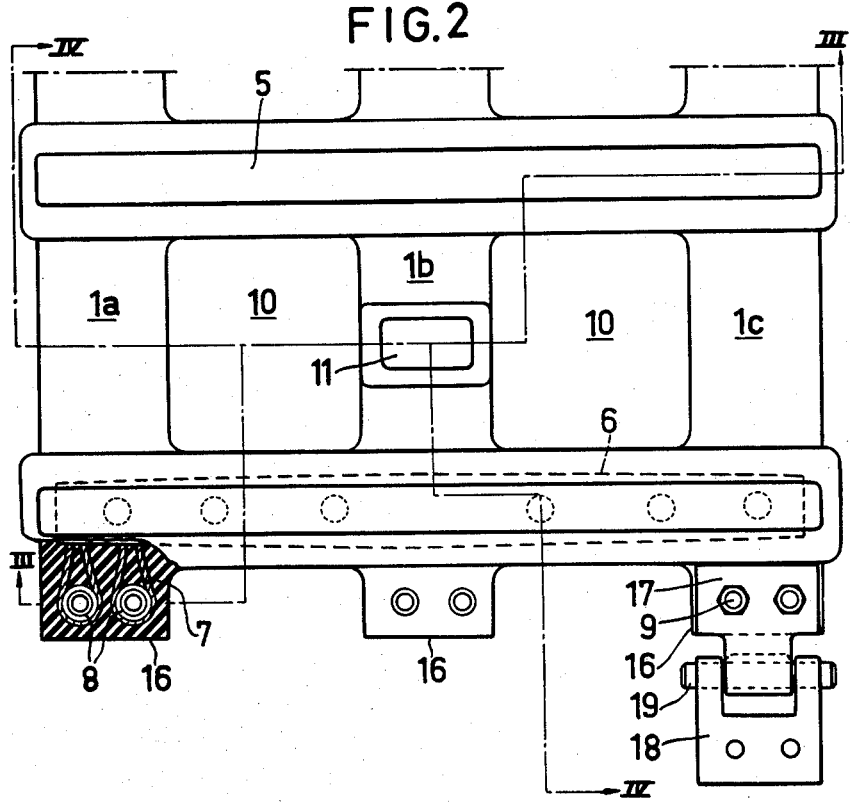
FIG. 2 is a plan view of a portion of the track of FIG. 1 viewed from above and partly in section.
Figure 3:
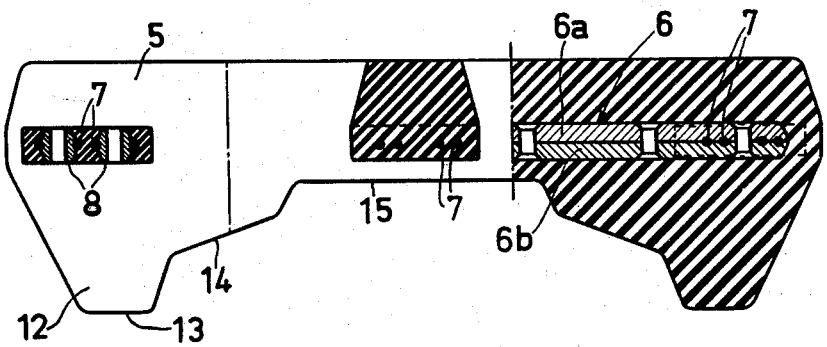
FIG. 3 is a transverse section along the line III—III of FIG. 2.
Figure 4:
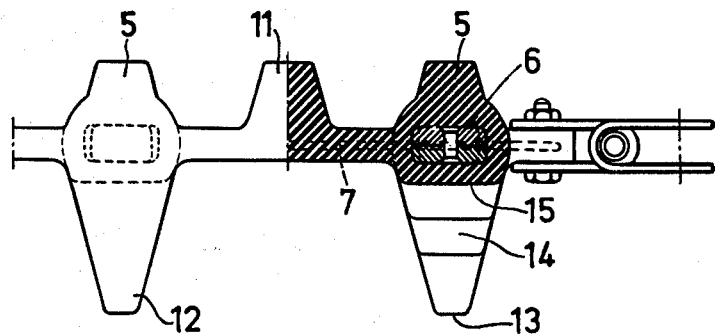
FIG. 4 is a side view partly in section along the line IV—IV of FIG. 2.

As can be seen most clearly in FIG. 2, the joining of the track can be carried out by terminating the partial tracks or bars 1a, 1b and 1c with end lugs 16 wherein the aforementioned sleeves 8 are enclosed. By means of said sleeves 8 and jointing bolts 9, link members 17 and 18 are secured to the end lugs 16 which members are articulated by track shoe bolts 19. In this manner, by directing the wires 7 at both ends of the track about the sleeves 8 and thereby also about the jointing bolts 9 and by safely connecting said bolts through the members 17, 18 a strong endless track is obtained which meets all requirements with respect to quiet run, wear resistance and care of road and tires.

A still stronger and better track joint is obtained by the embodiment shown in FIGS. 6 and 7. According to this embodiment, the terminating lugs 16 of the partial tracks or bars 1a, 1b and 1c are provided with cast-in jointing plates 20 having one or a plurality of hollows 21 for receiving anchoring heads 22 secured to the ends of the steel wires 7 and adjusted in shape to said hollows. The plates are further provided with holes 23 of a size allowing the wires but not the anchoring heads to pass therethrough. The plate may be made of one piece, but for reason of facilitating the insertion of the anchoring heads the plate is preferably divided in two parts which, after said insertion, can be joined together, for example by rivets. The plate includes further two holes 24 for receiving bolts connecting the plate with one of the link members 17, 18 while the other of said members is intended to be connected with a corresponding tension plate at the opposite end of the track. To prevent wear of the wires 7 by contact with the sharp steel edges around the holes 23, and also with the edges of the openings of the holes in the rods 6 said edges may be rounded or chamfered, for example 15°.

The technical advantage obtained by this type of jointing lies in the better utilization of the tensile strength of the wires, in view of the fact that the strength thereof decreases in a bending about a sleeve. For reasons of space, the diameter of the sleeves could not be made greater than 23 mm., at which diameter the tensile strength of the wires decreases by about 30%.

A further advantage is, that the distance between the wires can be reduced, with the result that the rubber on the outside of the outer steel wire will be thicker and thus provide better protection.

As a further advantage can be mentioned that, contrary to the conventional embodiment the direction of the wires is the same as the direction of the traction forces acting on the track, with the result that the risk of detrimental shearing forces by the wires on the rubber is decreased. Furthermore, the joint obtained has a better appearance.

The invention relates also to a tractor or like track-operated vehicle which is characterized in that it is provided with one or a plurality of tracks of the aforedescribed construction. The tractor may be arranged to be driven by rubber cog wheels engaging with the track.

In the places intended to be in driving cooperation with aforesaid drive cog wheels, the track may be provided with preferably exchangeable wear protecting means, for example of metal. Said protecting means may be U-shaped and adapted to be clamped either directly on the transverse rods 6, or on a thin rubber layer laid about the transverse rods.

What I claim is:

1. A vehicle track adapted to run on tires of a vehicle, said track comprising rod members extending transversely of the track and spaced apart longitudinally of said track, said rod members being connected by members extending longitudinally of the track and absorbing traction forces, a body of elastomer material substantially enclosing said traction-absorbing members together with said rod members, transversely extending, external projections of said elastomer material disposed at substantially equal distances from each other in the longitudinal direction of extent of said track at the same locations along the track as said rod members providing engagement between the track and the ground and said elastomer material having inwardly directed projections also disposed at the same locations along the track as said rod members guiding the track on the vehicle wheels, said external and inwardly directed projections being integral with the rest of said elastomer track material so that all said elastomer material can be formed in one operation.

2. A vehicle track adapted to run on tires of a vehicle, said tires being provided with outwardly projecting transversely extending ribs, said track comprising rod members extending transversely of the track and spaced apart longitudinally of said track, said rod members being connected by members extending longitudinally of the track and absorbing traction forces, a body of elastomer material substantially enclosing said traction-absorbing members together with said rod members, transversely extending, external projections of said elastomer material disposed at substantially equal distances from each other in the longitudinal direction of extent of said track at the same locations along the track as said rod members providing engagement between the track and the ground, and said elastomer material having inwardly directed projections also disposed at the same locations along the track as said rod member for engaging with said ribs of said tires and guiding the track on the vehicle wheels, said external and inwardly directed projections being integral with the rest of said elastomer track material so that all said elastomer material can be formed in one operation.

3. A track according to claim 1, and in which the inwardly directed projections on the track intended for controlling engagement with the tractor wheels have concave surfaces towards the wheels, the center of curvature of a projection on the right-hand side of the track being situated to the left of the central plane of the track, and vice versa.

4. A track according to claim 3, and in which said center of curvature is separated from the central plane of the track at a distance equal to from 5 to 15% of the curvature radius.

5. A vehicle track as claimed in claim 1, and in which members are divided longitudinally in two halves, and means comprising solely said elastomer material connecting together said two halves and said rod members with said traction members.

6. A track according to claim 1, and in which said track is provided with shoulders on the outer side of said track between said external projections.

7. A track according to claim 6, and in which said track is provided with through extending openings adjacent said shoulders.

8. A track according to claim 7, and in which said through-extending openings are disposed directly adjacent said projections in the longitudinal direction of extent of said track.

9. A track according to claim 1, and in which said track is provided with a joint, said traction-absorbing members comprising wires extending to said joint and being provided with anchoring heads of greater thickness than said wires, a jointing plate at each end of the track having hollows in which said heads are accommodated, respectively, and said plates also having holes of a size allowing said wires, but not said anchoring heads, to pass therethrough.

10. A track according to claim 9, and in which one of said jointing plates is located at each end of said track, two link members, each connected with one of said jointing plates, and linking the track ends so that an endless track is obtained.

11. A track according to claim 9, and in which the jointing plates are divided in order to facilitate the insertion of said anchoring heads.

References Cited in the file of this patent

UNITED STATES PATENTS

| | | |
|---|---|---|
| 2,326,719 | Myers | Aug. 10, 1943 |
| 2,338,819 | Mayne et al. | Jan. 11, 1944 |
| 2,345,763 | Mayne | Apr. 4 1944 |
| 2,387,802 | Mayne | Oct. 30, 1945 |
| 2,402,042 | Haushalter | June 11, 1946 |
| 2,404,487 | Hait | July 23, 1946 |
| 2,429,242 | Slemmons | Oct. 21, 1947 |
| 2,476,828 | Skromme | July 19, 1949 |
| 2,537,745 | Daniels | Jan. 9, 1951 |
| 2,541,177 | Slemmons | Feb. 13, 1951 |
| 2,560,307 | Slemmons | July 10, 1951 |
| 2,592,916 | Leguillon | Apr. 15, 1952 |
| 2,661,251 | Bonmartini | Dec. 1, 1953 |
| 2,987,347 | Cook et al. | June 6, 1961 |

FOREIGN PATENTS

| | | |
|---|---|---|
| 466,116 | Germany | Nov. 8, 1927 |